United States Patent
Xiao et al.

(10) Patent No.: US 8,305,566 B2
(45) Date of Patent: Nov. 6, 2012

(54) APPARATUS FOR DETECTING ELECTROMAGNETIC WAVES

(75) Inventors: Lin Xiao, Beijing (CN); Kai-Li Jiang, Beijing (CN); Yu-Ying Zhang, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 211 days.

(21) Appl. No.: 12/964,005

(22) Filed: Dec. 9, 2010

(65) Prior Publication Data

US 2011/0317155 A1 Dec. 29, 2011

(30) Foreign Application Priority Data

Jun. 25, 2010 (CN) .......................... 2010 1 0209989

(51) Int. Cl.
*G01J 1/42* (2006.01)
(52) U.S. Cl. .................... 356/218; 250/371; 250/370.01; 977/742; 977/833
(58) Field of Classification Search .......... 356/213–235, 356/121–122; 250/338.4, 473.1, 371, 370.01; 977/742, 732, 833, 834, 902, 954
See application file for complete search history.

(56) References Cited

U.S. PATENT DOCUMENTS

| | | | |
|---|---|---|---|
| 7,045,108 B2 | 5/2006 | Jiang et al. | |
| 8,009,284 B2 * | 8/2011 | Xiao et al. | 356/218 |
| 8,013,988 B2 * | 9/2011 | Xiao et al. | 356/218 |
| 2007/0166223 A1 | 7/2007 | Jiang et al. | |
| 2008/0170982 A1 | 7/2008 | Zhang et al. | |
| 2009/0197038 A1 | 8/2009 | Wang et al. | |
| 2009/0297732 A1 | 12/2009 | Jiang et al. | |
| 2010/0000989 A1 | 1/2010 | Feng et al. | |
| 2010/0039015 A1 | 2/2010 | Liu et al. | |
| 2010/0122980 A1 | 5/2010 | Wang et al. | |
| 2010/0147828 A1 * | 6/2010 | Wang et al. | 219/546 |
| 2012/0161008 A1 * | 6/2012 | Takahashi et al. | 250/340 |

FOREIGN PATENT DOCUMENTS

CN 101610613 12/2009
WO WO2007015710 2/2007

OTHER PUBLICATIONS

"Bolometric infrared photoresponse of suspended single-walled carbon nanotube films," Science, Mikhail E. Itkis et al., vol. 312, p. 412(2006).

* cited by examiner

*Primary Examiner* — Hoa Pham
(74) *Attorney, Agent, or Firm* — Altis Law Group, Inc.

(57) ABSTRACT

An apparatus for detecting electromagnetic waves includes a first electromagnetic wave sensor, two first electrodes, a second electromagnetic wave sensor, and two second electrodes. The two first electrodes are electrically connected to different portions of the first electromagnetic wave sensor. The second electromagnetic wave sensor crosses with and is spaced from the first electromagnetic wave sensor. The two second electrodes are electrically connected to different portions of the second electromagnetic wave sensor.

20 Claims, 9 Drawing Sheets

APPARATUS FOR DETECTING ELECTROMAGNETIC WAVES

RELATED APPLICATIONS

This application claims all benefits accruing under 35 U.S.C. §119 from China Patent Application No. 201010209989.9, filed on Jun. 25, 2010 in the China Intellectual Property Office, the disclosure of which is incorporated herein by reference. This application is also related to copending applications Ser. No. 12/462,734 (Publication No. U.S. 20100245808), filed on Aug. 6, 2009, entitles, "APPARATUS FOR DETECTING ELECTROMAGNETIC WAVE"; Ser. No. 12/584,668 (Publication No. U.S. 20100244864), filed on Sep. 9, 2009, entitles, "METHOD FOR DETECTING ELECTROMAGNETIC WAVE"; and Ser. No. 12/590,662, filed Nov. 12, 2009, entitles, "METHOD AND APPARATUS FOR DETECTING POLARIZING DIRECTION OF ELECTROMAGNETIC WAVE".

BACKGROUND

1. Technical Field

The present disclosure generally relates to an apparatus for detecting electromagnetic waves and, particularly, to a carbon nanotube based apparatus for detecting electromagnetic waves.

2. Description of Related Art

Carbon nanotubes (CNTs) are a novel carbonaceous material having an extremely small size and an extremely large specific surface area. Carbon nanotubes have received a great deal of interest since the early 1990s, because they have interesting and potentially useful electrical and mechanical properties, and have been widely used in many fields. A disordered carbon nanotube film based apparatus for detecting electromagnetic waves is disclosed in "Bolometric infrared photoresponse of suspended single-walled carbon nanotube films," Science, Mikhail E. Itkis et al., vol. 312, P412 (2006). The carbon nanotubes can uniformly absorb electromagnetic waves having different wavelengths. When the disordered carbon nanotube film is irradiated by electromagnetic waves having different wavelengths, the resistance of the disordered carbon nanotube film changes. Thus, the intensity of the incident electromagnetic waves can be detected by detecting the resistance of the irradiated disordered carbon nanotube film.

However, the above apparatus can only detect the intensity of electromagnetic waves, and not the polarizing direction thereof.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
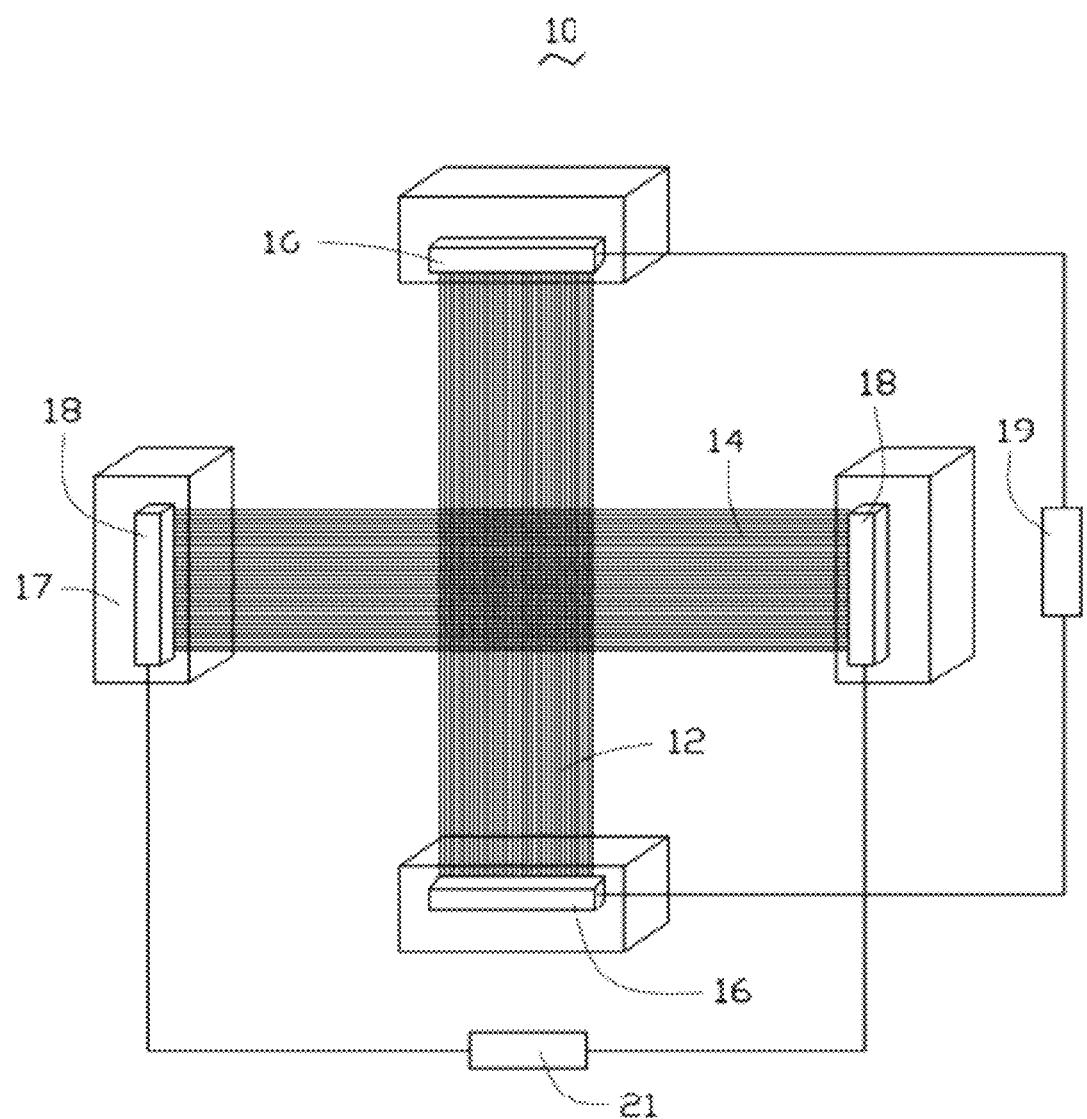
FIG. 1 is a schematic view of one embodiment of an apparatus for detecting electromagnetic waves.

Referring to FIG. 1, one embodiment of an apparatus 10 for detecting electromagnetic waves includes a first electromagnetic wave sensor 12, a second electromagnetic wave sensor 14, two first electrodes 16, and two second electrodes 18. The two first electrodes 16 are electrically connected to opposite ends of the first electromagnetic wave sensor 12. The two second electrodes 18 are electrically connected to opposite ends of the second electromagnetic wave sensor 14.

The first electromagnetic wave sensor 12 and the second electromagnetic wave sensor 14 can have the same or similar structures. In one embodiment, each of the first electromagnetic wave sensor 12 and the second electromagnetic wave sensor 14 can have or be a carbon nanotube structure, namely a first carbon nanotube structure and a second carbon nanotube structure, respectively. Both the first carbon nanotube structure and the second carbon nanotube structure can have a sheet shape.

The first carbon nanotube structure can include a plurality of carbon nanotubes arranged substantially along a first axis. The first axis is shown as a vertical direction in FIG. 1. The two first electrodes 16 are electrically connected to opposite ends of the first electromagnetic wave sensor 12 along the first axis. In other words, the first carbon nanotube structure extends between the two first electrodes 16 along the first axis.

The second carbon nanotube structure can include a plurality of carbon nanotubes arranged substantially along a second axis. The second axis is shown as a horizontal direction in FIG. 1. The two second electrodes 18 are electrically connected to opposite ends of the second electromagnetic wave sensor 14 along the second axis. In other words, the second carbon nanotube structure extends between the two second electrodes 18 along the second axis. The second axis is substantially perpendicular to the first axis. The second carbon nanotube structure is spaced from the first carbon nanotube structure along a third axis, which is substantially perpendicular to the first axis and the second axis.

The carbon nanotubes can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers.

Both the first and second carbon nanotube structures can be or have at least one carbon nanotube film, at least one carbon nanotube wire structure, or a combination thereof. Some examples of the first and second carbon nanotube structures are given below.

Carbon Nanotube Film

The carbon nanotube film can be or have a drawn carbon nanotube film, a strip-shaped carbon nanotube film, or a carbon nanotube film of ultra-long carbon nanotubes.

In one embodiment, each of the first and second carbon nanotube structures can include at least one drawn carbon nanotube film. Examples of a drawn carbon nanotube film are taught by U.S. Pat. No. 7,045,108 to Jiang et al., and WO 2007015710 to Zhang et al.

The drawn carbon nanotube film includes a plurality of carbon nanotubes that can be arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction by Van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The term "free-standing structure" can be defined as a structure that does not need to be supported by a substrate. For example, a free standing structure can sustain the weight of itself when it is hoisted by a portion thereof without any significant damage to its structural integrity. So, if the drawn carbon nanotube film is placed between two separate supporters, a portion of the drawn carbon nanotube film, not in contact with the two supporters, would be suspended between the two supporters and yet maintain film structural integrity. The free-standing structure of the drawn carbon nanotube film is realized by the successive carbon nanotubes joined end to end by Van der Waals attractive force.

Figure 3:
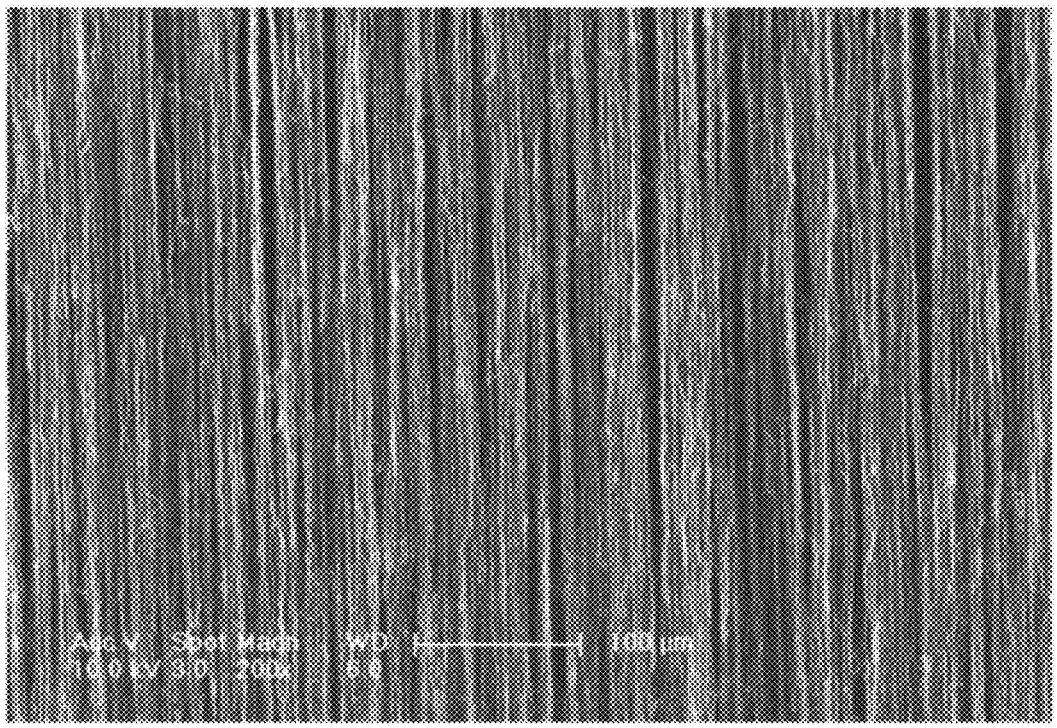
FIG. 3 shows a Scanning Electron Microscope (SEM) image of a drawn carbon nanotube film.

It can be appreciated that some variation can occur in the orientation of the carbon nanotubes in the drawn carbon nanotube film as can be seen in FIG. 3. Microscopically, the carbon nanotubes oriented substantially along the same direction may not be perfectly aligned in a straight line, and some curve portions may exist. It can be understood that some carbon nanotubes located substantially side by side and oriented along the same direction in contact with each other cannot be excluded.

Figure 2:
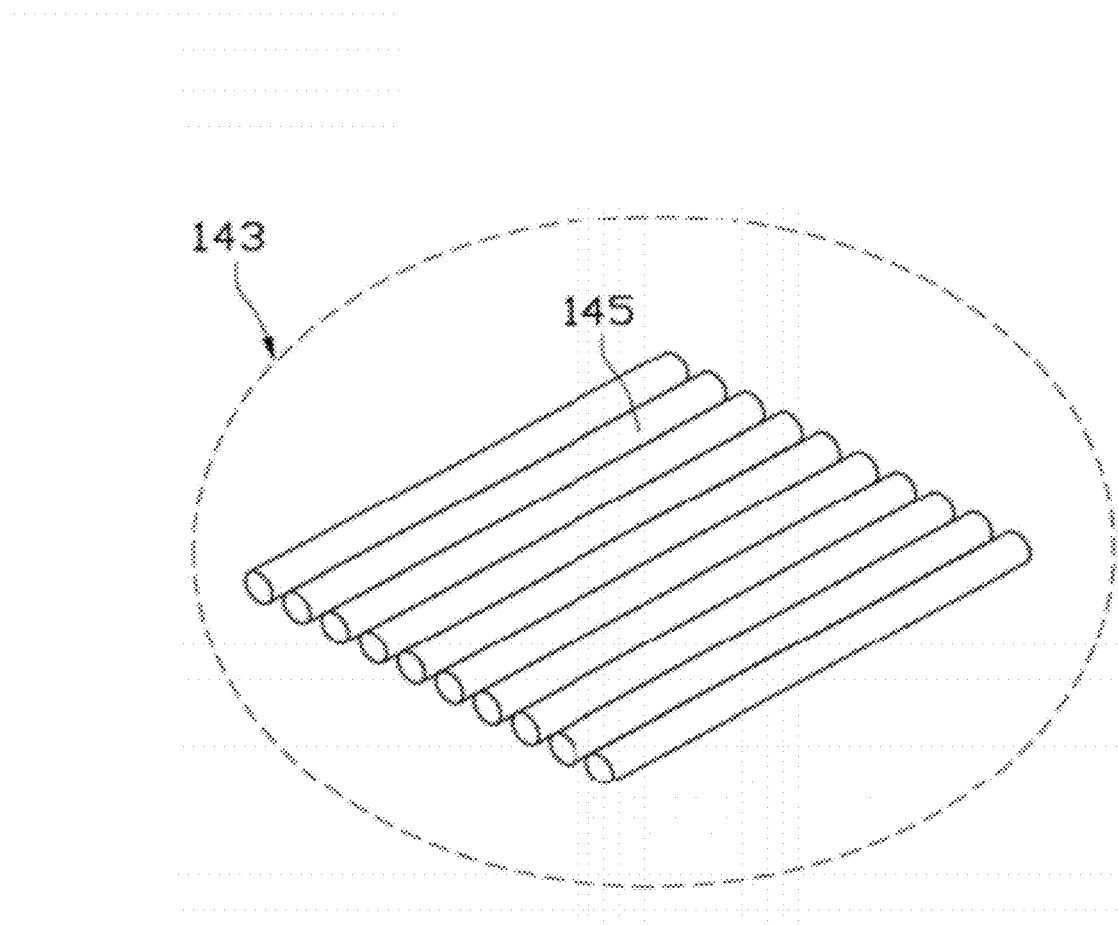
FIG. 2 is a structural schematic view of a carbon nanotube segment.

More specifically, referring to FIG. 2, the drawn carbon nanotube film includes a plurality of successively oriented carbon nanotube segments 143 joined end-to-end by Van der Waals attractive force therebetween. Each carbon nanotube segment 143 includes a plurality of carbon nanotubes 145 substantially parallel to each other, and joined by Van der Waals attractive force therebetween. The carbon nanotube segments 143 can vary in width, thickness, uniformity, and shape. The carbon nanotubes 145 in the drawn carbon nanotube film 143 are also substantially oriented along a preferred orientation.

Each of the first and second carbon nanotube structures can also include at least two stacked drawn carbon nanotube films. In other embodiments, each of the first and second carbon nanotube structures can include two or more coplanar drawn carbon nanotube films. Coplanar drawn carbon nanotube films can also be stacked upon other coplanar films. Adjacent drawn carbon nanotube films can be combined by only Van der Waals attractive forces therebetween without the need of additional adhesive. The aligned directions of the carbon nanotubes in the two adjacent drawn carbon nanotube films are substantially the same.

In one embodiment, each of the first and second carbon nanotube structures can include at least one strip-shaped carbon nanotube film. Examples of a strip-shaped carbon nanotube film are taught by U.S. Publication No. 20090297732 to Jiang et al.

The strip-shaped carbon nanotube film can be produced by growing a strip-shaped carbon nanotube array, and pushing the strip-shaped carbon nanotube array down along a direction substantially perpendicular to a length of the strip-shaped carbon nanotube array. The strip-shaped carbon nanotube film comprises a plurality of carbon nanotubes, which are substantially parallel to each other, have almost equal lengths, and combined side by side by van der Waals attractive force therebetween. The width of the strip-shaped carbon nanotube film is substantially equal to the length of the carbon nanotubes, thus at least one carbon nanotube spans the entire width of the strip-shaped carbon nanotube film. The strip-shaped carbon nanotube film has a length of about 20 microns to about 10 millimeters. The length of the strip-shaped carbon nanotube film is limited only by the length of the strip. A larger strip-shaped carbon nanotube film can be formed by having a plurality of the strips lined up side by side and folding the carbon nanotubes grown thereon over such that there is overlap between the carbon nanotubes on adjacent strips.

In other embodiments, each of the first and second carbon nanotube structures can include a carbon nanotube film of ultra-long carbon nanotubes. Examples of a carbon nanotube film of ultra-long carbon nanotubes are taught by U.S. PGPub. 20090197038A1 to Wang et al., and U.S. PGPub. 20090297732A1 to Jiang et al. The carbon nanotube film comprises a plurality of ultra-long carbon nanotubes, the ultra-long carbon nanotubes are parallel to a surface of the carbon nanotube film and are parallel to each other. A length of the ultra-long carbon nanotube is approximately 10 centimeters or greater. In one embodiment, the length of the ultra-long carbon nanotube can be equal to the length of the carbon nanotube film, and opposite ends of at least one of the ultra-long carbon nanotubes can be opposite ends of the carbon nanotube film.

Carbon Nanotube Wire Structure

Figure 4:
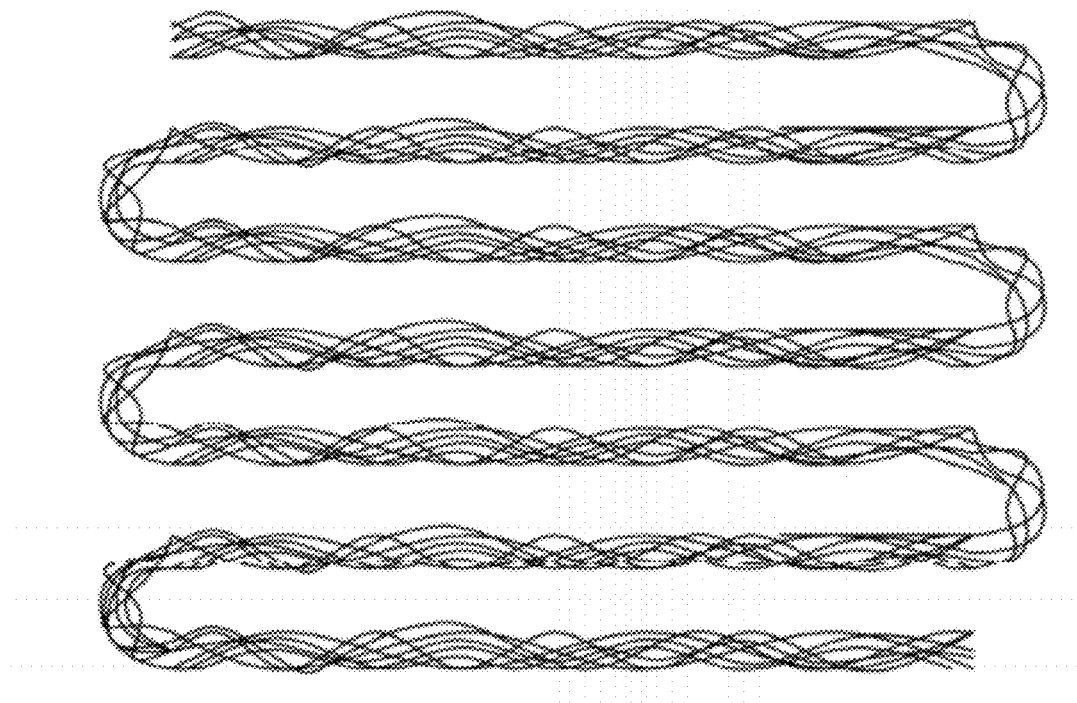
FIG. 4 is a structural schematic view of a carbon nanotube wire structure bent orderly in a plane.
Figure 5:
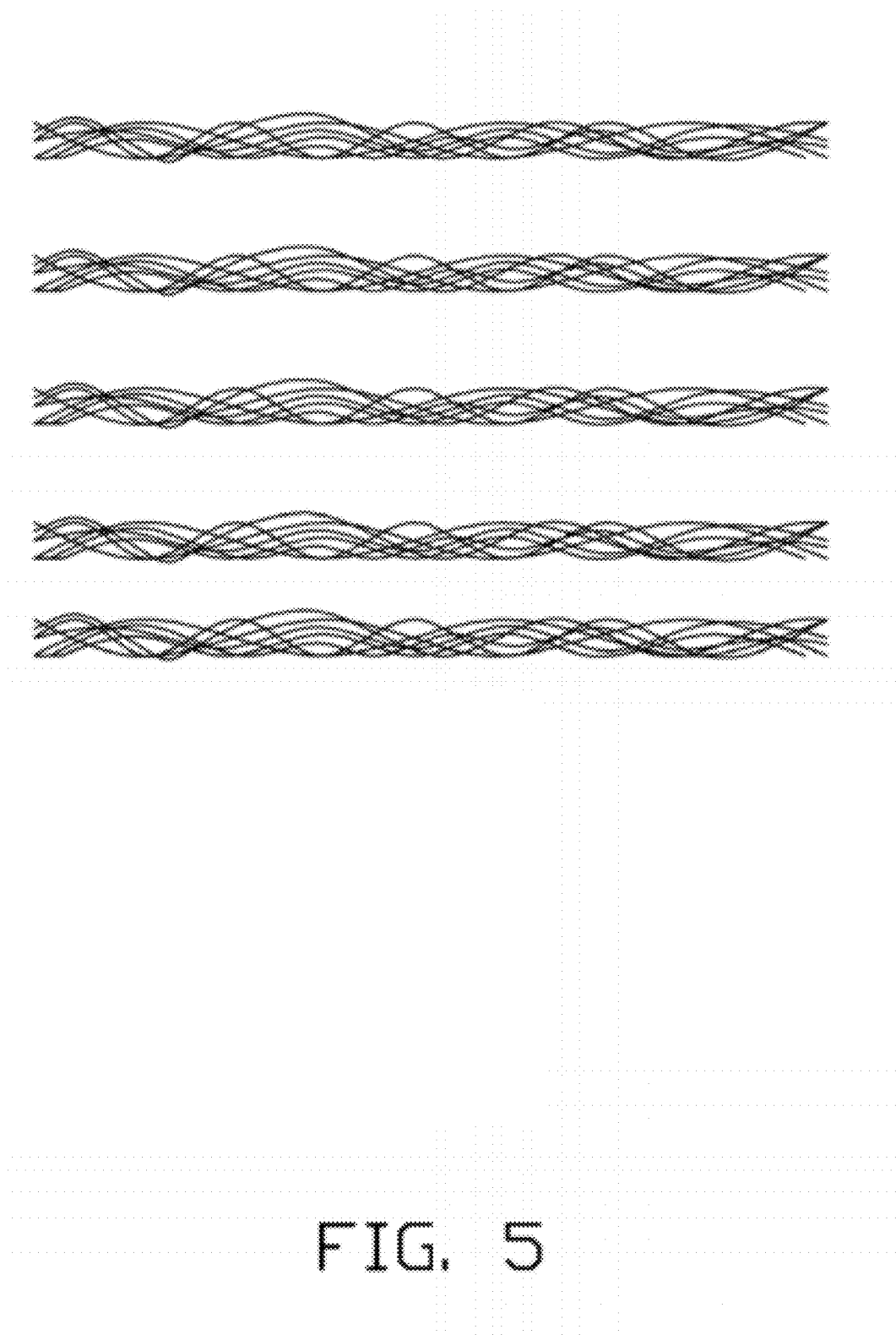
FIG. 5 is a structural schematic view of a plurality of carbon nanotube wire structures substantially parallel to each other in a plane.

In other embodiments, each of the first and second carbon nanotube structures includes one or more carbon nanotube wire structures. The carbon nanotube wire structure includes twisted carbon nanotube wires, untwisted carbon nanotube wires, or combinations thereof. The carbon nanotube wires in the carbon nanotube wire structure can be substantially parallel to each other to form a bundle-like structure or twisted with each other to form a twisted structure. If both the first and second the carbon nanotube structures includes a plurality of carbon nanotube wire structures, the carbon nanotube wire structures can be coplanar and substantially parallel to each other, or stacked and substantially parallel to each other. Referring to FIG. 4, both the first and second carbon nanotube structures includes one carbon nanotube wire structure. The carbon nanotube wire structure bends orderly in a surface, thereby forming a planar structure. The carbon nanotube wires of the carbon nanotube wire structure are substantially parallel to each other and arranged side by side beside the bend portions. Referring to FIG. 5, if each of the first and second carbon nanotube structures includes a plurality of carbon nanotube wire structures, the carbon nanotube wire structures are substantially parallel to each other and arranged side by side in a surface, thereby forming a planar structure.

The non-twisted carbon nanotube wire can be formed by treating the drawn carbon nanotube film with an organic solvent. Specially, the drawn carbon nanotube film is treated by applying the organic solvent to the drawn carbon nanotube film to soak the entire surface of the drawn carbon nanotube film. After being soaked by the organic solvent, the adjacent parallel carbon nanotubes in the drawn carbon nanotube film will bundle together due to the surface tension of the volatile organic solvent as the organic solvent volatilizes. Thus, the drawn carbon nanotube film will be shrunk into a non-twisted carbon nanotube wire. The non-twisted carbon nanotube wire includes a plurality of carbon nanotubes substantially oriented along a same direction (e.g., a direction along the length of the non-twisted carbon nanotube wire). The carbon nanotubes are substantially parallel to the axis of the non-twisted carbon nanotube wire. Specifically, the non-twisted carbon nanotube wire includes a plurality of carbon nanotube segments joined end-to-end by van der Waals attractive force therebetween. Each carbon nanotube segment includes a plurality of carbon nanotubes substantially parallel to each other and combined by van der Waals attractive force. A length of the non-twisted carbon nanotube wire can range from about 0.5 nanometers to about 100 microns. In one embodiment, the diameter of the non-twisted carbon nanotube wire is about 50 microns. Examples of the non-twisted carbon nanotube wire are taught by US Patent Application Publication US 20070166223 to Jiang et al.

The twisted carbon nanotube wire can be formed by twisting a drawn carbon nanotube film by using a mechanical force to turn the two ends of the drawn carbon nanotube film in opposite directions. The twisted carbon nanotube wire includes a plurality of carbon nanotubes oriented around an axis of the twisted carbon nanotube wire. The carbon nanotubes are aligned in a helix around the axis of the carbon nanotube twisted wire. More specifically, the twisted carbon nanotube wire includes a plurality of successive carbon nanotube segments joined end-to-end by van der Waals attractive force. The carbon nanotube segment has arbitrary length, thickness, uniformity, and shape. A length of the carbon nanotube wire can be arbitrarily set as desired. A diameter of the twisted carbon nanotube wire can range from about 0.5 nanometers to about 100 microns. Further, the twisted carbon nanotube wire can be treated with a volatile organic solvent, before or after being twisted. After being soaked by the organic solvent, the adjacent parallel carbon nanotubes in the twisted carbon nanotube wire will bundle together due to the surface tension of the organic solvent as the organic solvent volatilizes. The specific surface area of the twisted carbon nanotube wire will increase. The mechanical stability of the apparatus 10 is improved because the carbon nanotube wire structure has a higher strength. Thus, the lifespan of the apparatus 10 can be prolonged.

In one embodiment, each of the first and second carbon nanotube structures is composed of at least one carbon nanotube film and at least one carbon nanotube wire structure. The carbon nanotubes in the carbon nanotube film are substantially parallel to the carbon nanotube wire structures.

The thickness of the first and second carbon nanotube structures cannot be too thick such that temperature changes under electromagnetic wave illumination are hampered. Meanwhile, the thicker the first and second carbon nanotube structures, the smaller the effective surface area. The reduction in the effective surface area will hamper sufficient heat exchange with the environment medium, resulting in a slow response time of the apparatus 10. The thickness of the first and second carbon nanotube structures cannot be too thin. If the thickness of the first and second carbon nanotube structures is too thin, the first and second carbon nanotube structures will be weak and can be damaged easily while detecting electromagnetic waves, thereby reducing the lifespan of the first and second carbon nanotube structures.

The carbon nanotubes are close to an absolute blackbody. The first and second carbon nanotube structures have near uniform absorption ability over the entire electromagnetic spectrum including radio, microwave through far infrared, near infrared, visible, ultraviolet, X-rays, gamma rays, and high energy gamma rays. The first and second carbon nanotube structures absorb the electromagnetic waves and covert the electromagnetic energy into heat energy. The heat capacity per unit area of the first and second carbon nanotube structures can be less than $2 \times 10^{-4}$ $J/cm^2 \cdot K$. In one embodiment, the heat capacity per unit area of the first and second carbon nanotube structures is less than or equal to about $1.7 \times 10^{-6}$ $J/cm^2 \cdot K$. Thus, the temperature of the first and second carbon nanotube structures can rapidly change by the intensity change of the input electromagnetic waves. The resistance of the first and second carbon nanotube structures changes according to temperature changes of the first and second carbon nanotube structures. The first and second carbon nanotube structures can detect the intensity of electromagnetic waves in the range from microwatts to kilowatts.

In addition, the carbon nanotubes of the first carbon nanotube structure are substantially parallel and extend along the first axis, and the carbon nanotubes of the second carbon nanotube structure are substantially parallel and extend along the second axis. Thus, an electromagnetic wave is absorbed by at least one of the first and second carbon nanotube structures. The oscillations of the electromagnetic wave are in a plane perpendicular to the wave's direction of travel. In one embodiment, the electromagnetic wave's direction of travel is substantially perpendicular to the surface of the first and second carbon nanotube structures. Parts of the electromagnetic wave with an oscillation (or oscillation vector) direction substantially parallel to the length orientation of the carbon nanotubes of the first carbon nanotube structure are absorbed by the first carbon nanotube structure. Other parts of the electromagnetic wave with the oscillation (or oscillation vector) direction substantially perpendicular to the length orientation of the carbon nanotubes of the first carbon nanotube structure pass through the first carbon nanotube structure, travel through and are absorbed by the second carbon nanotube structure.

As described above, the parts of the electromagnetic wave with a polarizing direction parallel to the length orientation of the carbon nanotubes of the first carbon nanotube structure, are primarily absorbed by the first carbon nanotube structure. Changes in electromagnetic wave absorption intensity induce changes in the temperature of the first carbon nanotube structure. The resistance of the first carbon nanotube structure changes with respect to the changes in the temperature of the first carbon nanotube structure. The stronger the electromagnetic wave absorption of the first carbon nanotube structure, the higher the temperature of the first carbon nanotube structure and the smaller the resistance of the first carbon nanotube structure, and vice versa. The resistance variation of the first carbon nanotube structure can be measured by a first measuring device 19 connected to the first electrodes 16. The first measuring device 19 can be an electric current measuring device (e.g., an ammeter) or a voltage measuring device (e.g., a voltmeter). The first carbon nanotube structure can measure the intensity of the parts of the electromagnetic wave with a polarizing direction parallel to the length orientation of the carbon nanotubes of the first carbon nanotube structure, according to the resistance changes of the first carbon nanotube structure.

At the same time, other parts of the electromagnetic wave with polarizing direction perpendicular to the length orientation of the carbon nanotubes of the first carbon nanotube structure primarily pass through the first carbon nanotube structure, then travel to and are absorbed by the second carbon nanotube structure. Changes in electromagnetic wave absorption intensity induce changes in the temperature of the second carbon nanotube structure. The resistance of the second carbon nanotube structure changes with respect to the changes in the temperature of the second carbon nanotube structure. The stronger the electromagnetic wave absorption of the second carbon nanotube structure, the higher the temperature of the second carbon nanotube structure and the smaller the resistance of the second carbon nanotube structure, and vice versa. The resistance variation of the second carbon nanotube structure can be measured by a second measuring device 21 connected to the second electrodes 18. The second measuring device 21 can be an electric current measuring device (e.g., an ammeter) or a voltage measuring device (e.g., a voltmeter). The second carbon nanotube structure can measure the intensity of the other parts of the electromagnetic wave with a polarizing direction parallel to the length orientation of the carbon nanotubes of the second carbon nanotube structure, according to the resistance changes of the second carbon nanotube structure. Thus, the first and second carbon nanotube structures can measure intensities of the electromagnetic wave with different polarizing directions when the electromagnetic wave travels through the first carbon nanotube structure to the second carbon nanotube structure.

Figure 6:
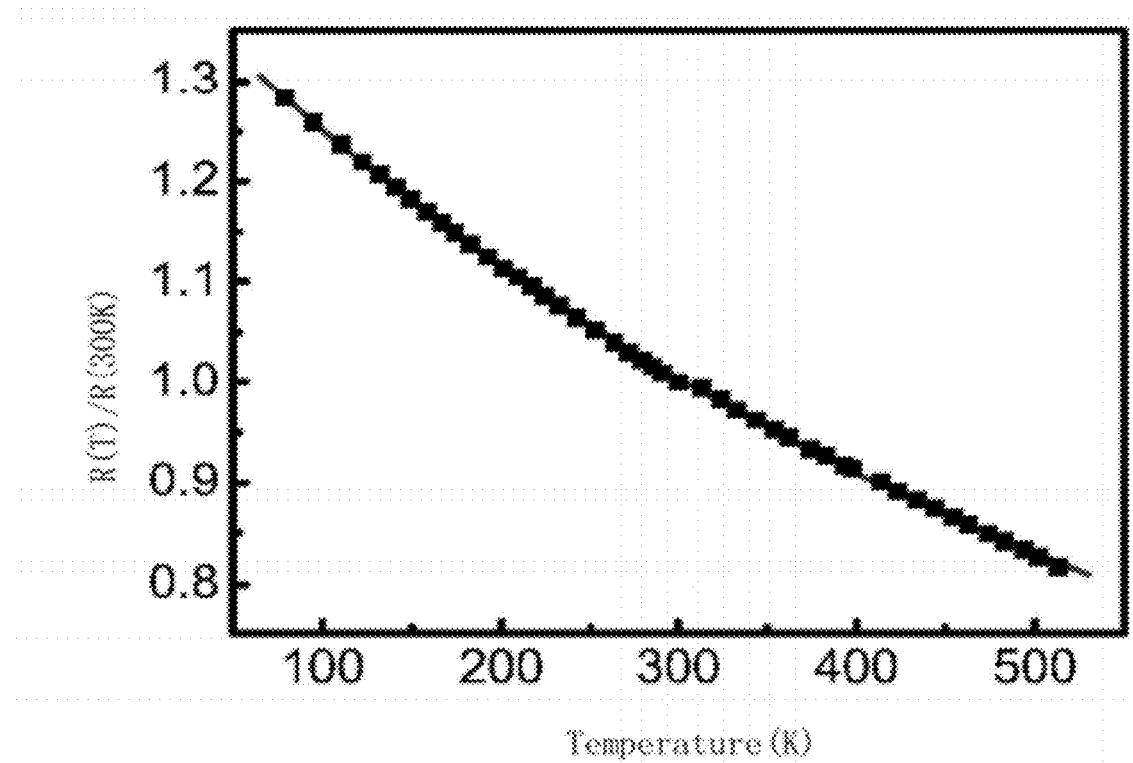
FIG. 6 is a diagram showing a relationship between a resistance changing rate of an electromagnetic wave sensor and temperature.
Figure 7:
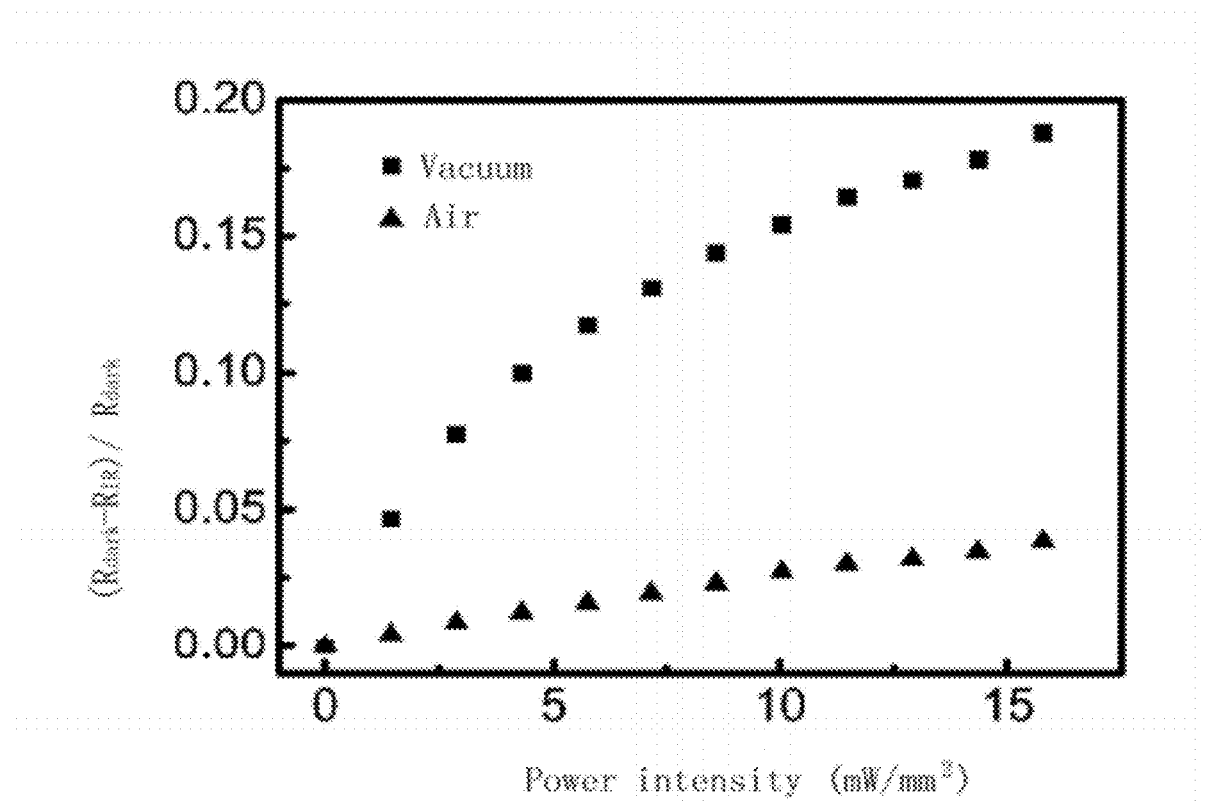
FIG. 7 is a diagram showing relationships between a resistance changing rate of the electromagnetic wave sensor and power intensity in vacuum and in air.
Figure 8:
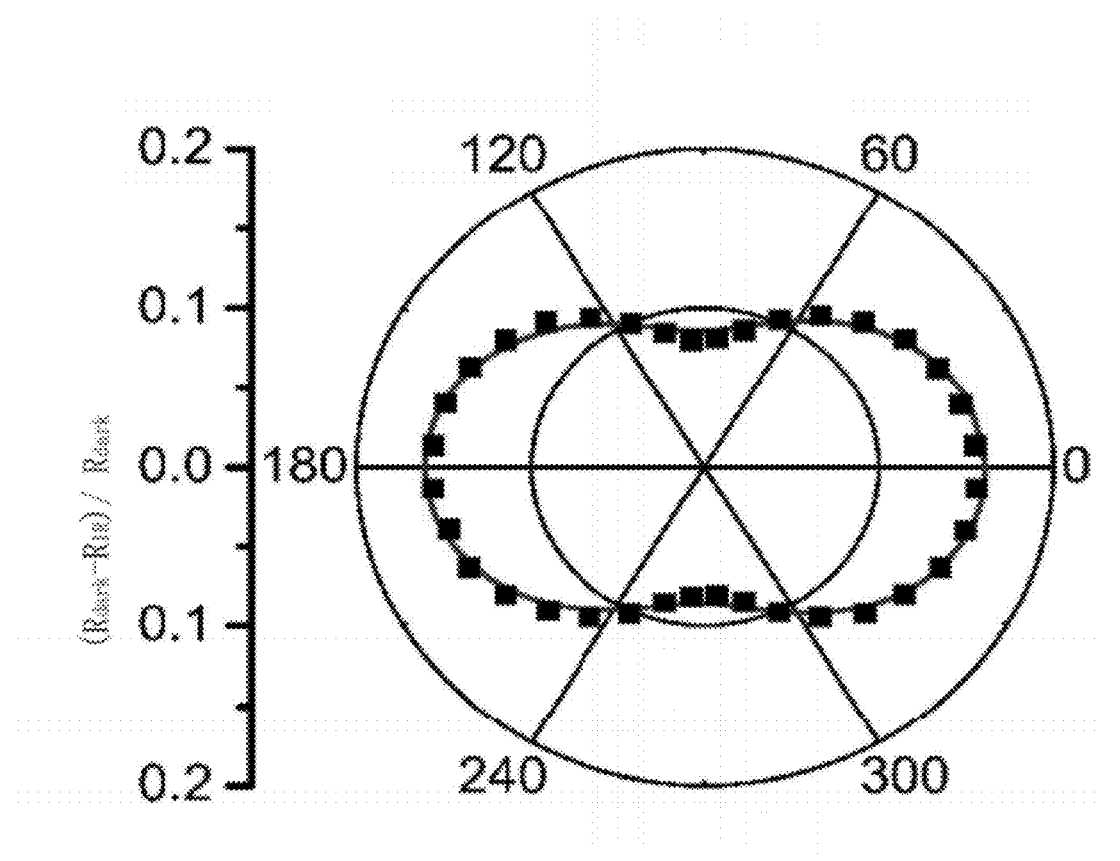
FIG. 8 is a diagram showing a relationship between a resistance changing rate of the electromagnetic wave sensor and an angle between a polarizing direction of the electromagnetic wave and a length direction of carbon nanotubes in the electromagnetic wave sensor.

Referring to FIGS. 6-8, R(300K) represents the resistance of the first or second carbon nanotube structure when the temperature of the first or second carbon nanotube structure is about 300 K. R(T) represents the resistance of the first or second carbon nanotube structure when the temperature of the first or second carbon nanotube structure is at temperature T. $R_{dark}$ represents the resistance of the first or second carbon nanotube structure when the first or second carbon nanotube structure is not irradiated. $R_{IR}$ represents the resistance of the first or second carbon nanotube structure when the first or second carbon nanotube structure is irradiated. FIGS. 6-8 reveal that the stronger the electromagnetic wave absorption of the first or second carbon nanotube structure, the higher the temperature of the first or second carbon nanotube structure and the smaller the resistance of the first or second carbon nanotube structure, and vice versa. By measuring the resistance changes of the first or second carbon nanotube structure, the first or second carbon nanotube structure can measure the intensity of the electromagnetic wave with a polarizing direction parallel to the length orientation of the carbon nanotubes of the first or second carbon nanotube structure. Thus, the apparatus 10 does not need additional photosensitive media, thereby reducing the cost and volume of the apparatus 10.

The first electrodes 16 and the second electrodes 18 can be made of conductive material. The material of the first electrodes 16 and the second electrodes 18 can be one or more metals, conductive adhesive, carbon nanotubes, indium tin oxide, or other conductive material. The shape of the first electrodes 16 and the second electrodes 18 is not limited and can be lamellar, rod, wire, block, or other shapes. In one embodiment, the first electrodes 16 and the second electrodes 18 are rod-shaped metal electrodes. The carbon nanotubes of the first carbon nanotube structure extend along the first axis from one of the first electrodes 16 to the other first electrode 16. The carbon nanotubes of the second carbon nanotube structure extend along the second axis from one of the second electrodes 18 to the other second electrode 18. The first and the second carbon nanotube structures having a large specific surface area can adhere better under the effect of the van der Waals attractive force and can be adhered directly to the first electrodes 16 and the second electrodes 18. This will result in good electrical contact between the first carbon nanotube structure and the first electrodes 16, and between the second carbon nanotube structure and the second electrodes 18. Further, a conductive adhesive layer (not shown) can be further provided between the first electrodes 16 and the first carbon nanotube structure, and between the second electrodes 18 and the second carbon nanotube structure. The conductive adhesive layer can be applied to the surface of the first carbon nanotube structure to provide electrical contact and adhesion between the first carbon nanotube structure and the first electrodes 16. The conductive adhesive layer can also be applied to the surface of the second carbon nanotube structure to provide electrical contact and adhesion between the second carbon nanotube structure and the second electrodes 18.

In one embodiment, the apparatus 10 can further include a supporting structure 17 to support the first and second carbon nanotube structures thereon. The supporting structure 17 can be made of a material having a relatively low thermal conductivity such as glass, rigid plastic, wood, or ceramic. In the embodiment shown in FIG. 1, the supporting structure 17 includes two opposite first ceramic blocks and two opposite second ceramic blocks. The first ceramic blocks and the second ceramic blocks are alternatively arranged to form a rectangular figure. The first ceramic blocks have the same or a similar height. The second ceramic blocks have the same or a similar height, and spaced from the first carbon nanotube structure along the third axis. Opposite ends of the first carbon nanotube structure are respectively installed between the first electrodes 16 and the first ceramic blocks. Opposite ends of the second carbon nanotube structure are respectively installed between the second electrodes 18 and the second ceramic blocks. In one embodiment the first and second carbon nanotube structures are substantially coplanar separate by a predetermined distance.

The structure of the apparatus 10 of one embodiment has been described above. A method using the apparatus 10 to detect electromagnetic waves can include the steps of:

(1) providing the apparatus 10 with relation curves between a resistance changing rate of the first electromagnetic wave sensor 12 and power intensity, and between a resistance changing rate of the second electromagnetic wave sensor 14 and power intensity;

(2) irradiating the first and second carbon nanotube structures with an electromagnetic wave to be measured, thereby changing the resistances of each of the first and second carbon nanotube structures;

(3) measuring the resistances of each of the first and second carbon nanotube structures through the first measuring device 19 and the second measuring device 21;

(4) comparing the resistances of each of the first and second carbon nanotube structures obtained by the first measuring device 19 and the second measuring device 21 with the relation curves of the apparatus 10, to obtain the polarizing directions and intensities at the polarizing directions of the measured electromagnetic wave.

In step (1), the relation curve between a resistance changing rate of the first electromagnetic wave sensor 12 or the second electromagnetic wave sensor 14 and power intensity can be obtained through the following steps:

(11) measuring the $R_{dark}$ of each of the first and second carbon nanotube structures;

(12) measuring the $R_{IR}$ of each of the first and second carbon nanotube structures when each of the first and second carbon nanotube structures is irradiated by a plurality of known electromagnetic waves with different power intensities; and

(13) calculating the $(R_{dark}-R_{IR})/R_{dark}$ and plotting out the relation curve between the resistance changing rate of the first electromagnetic wave sensor 12 or the second electromagnetic wave sensor 14 and the power intensities of the electromagnetic waves.

In one embodiment, the first and the second carbon nanotube structures can be the same, and the relation curve between the resistance changing rate of the first electromagnetic wave sensor 12 and the power intensities of the electromagnetic waves can be used for the second electromagnetic wave sensor 14. FIG. 7 shows the relation curves between resistance change rates of the first carbon nanotube structure of 15 layers of drawn carbon nanotube films and power intensities of different electromagnetic waves in vacuum and in air. FIG. 7 reveals that the first carbon nanotube structure is more sensitive to electromagnetic waves in vacuum than in air.

Figure 9:
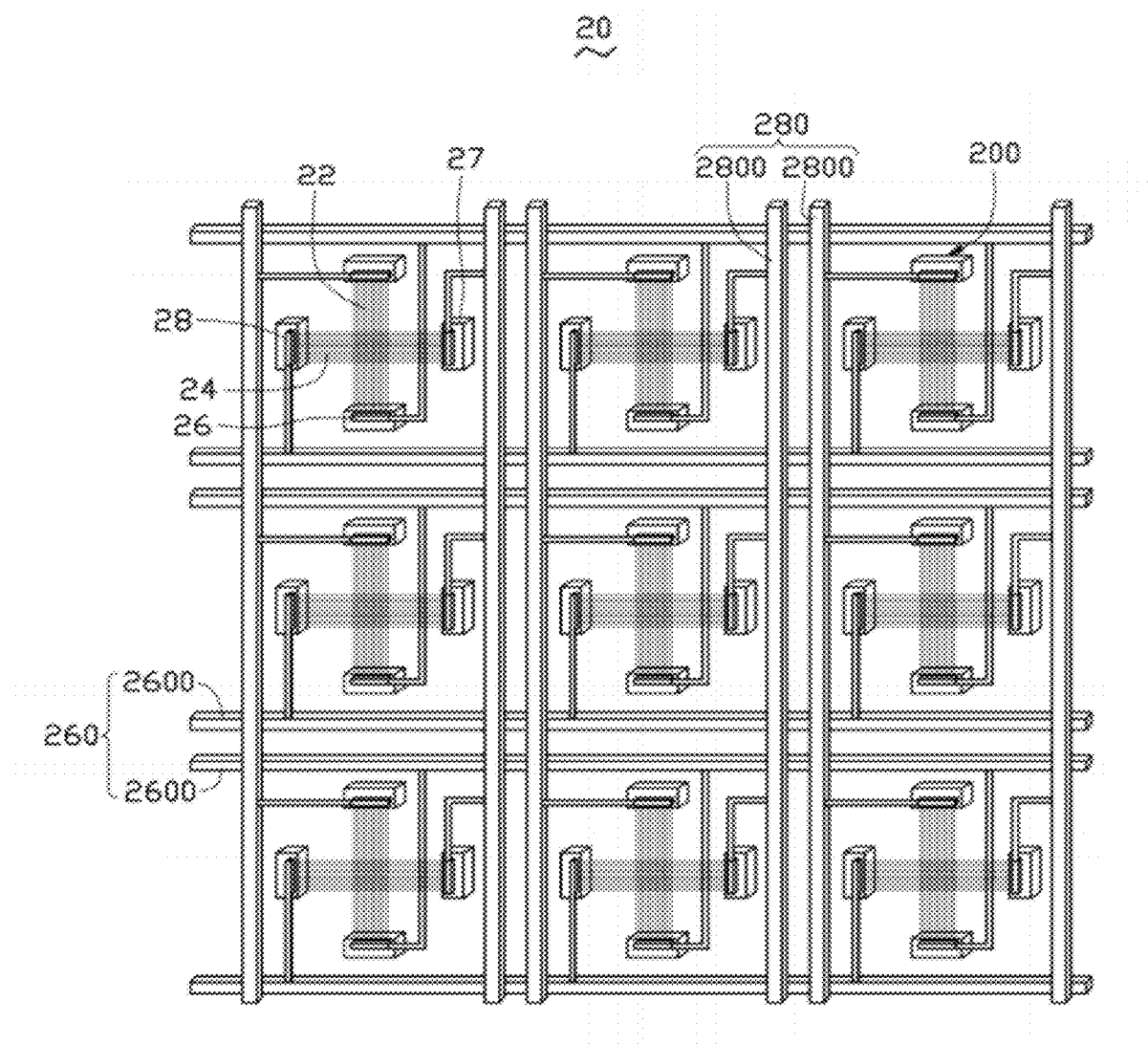
FIG. 9 is a schematic view of another embodiment of an apparatus for detecting electromagnetic waves.

Referring to FIG. 9, one embodiment of another apparatus 20 for detecting electromagnetic waves includes a plurality of first conductive strips 260, a plurality of second conductive strips 280, and a plurality of electromagnetic wave detection units 200. The first conductive strips 260 are substantially parallel to and spaced from each other. The second conductive strips 280 are substantially parallel to and spaced from each other. The second conductive strips 280 are oriented to be substantially perpendicular to the first conductive strips 260 to from a grid structure, which includes a plurality of isolated regions arranged in lines and rows. The first conductive strips 260 are insulated from the second conductive strips 280 with insulation sheets or other insulation structures interposed between the first conductive strips 260 and the second conductive strips 280. Each of the first conductive strips 260 includes two substantially parallel and spaced first conductive lines 2600. Each of the second conductive strips 280 includes two substantially parallel and spaced second conductive lines 2800.

The electromagnetic wave detection units 200 are located in the isolated regions in a one-to-one manner. Each of the electromagnetic wave detection units 200 is substantially the same as that of the apparatus 10, and includes a first electromagnetic wave sensor 22, a second electromagnetic wave sensor 24, two first electrodes 26, and two second electrodes 28. The first electromagnetic wave sensor 22 is substantially the same as the first electromagnetic wave sensor 12. The second electromagnetic wave sensor 24 is substantially the same as the second electromagnetic wave sensor 14.

When one of the electromagnetic wave detection units 200 is disposed in one of the isolated regions, two substantially parallel first conductive lines 2600 and two substantially parallel second conductive lines 2800 surround the electromagnetic wave detection unit 200. The second conductive lines 2800 are substantially perpendicular to the first conductive lines 2600. One of the first electrodes 26 is connected to one of the first conductive lines 2600, while the other first electrode 26 is connected to one of the second conductive lines 2800. One of the second electrodes 28 is connected to the other first conductive line 2600, while the other second electrode 28 is connected to the other second conductive line 2800. Furthermore, each of the electromagnetic wave detection units 200 can further include a supporting structure 27 to install the first and second electrodes 26, 28. The supporting structure 27 is substantially the same as the supporting structure 17.

Because each of the first and second electromagnetic wave sensors 22, 24 can be a carbon nanotube structure that can sense infrared rays, the apparatus 20 can be used as an infrared polarization imaging system.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What claimed is:

1. An apparatus for detecting electromagnetic waves, the apparatus comprising:
    a first electromagnetic wave sensor;
    two first electrodes electrically connected to different portions of the first electromagnetic wave sensor;
    a second electromagnetic wave sensor crossing with and spaced from the first electromagnetic wave sensor; and
    two second electrodes electrically connecting to different portions of the second electromagnetic wave sensor.

2. The apparatus of claim 1, wherein the first electromagnetic wave sensor comprises a first carbon nanotube structure comprising a plurality of carbon nanotubes arranged substantially along a first axis; the second electromagnetic wave sensor comprises a second carbon nanotube structure comprising a plurality of carbon nanotubes arranged substantially along a second axis; the first carbon nanotube structure is spaced from the second carbon nanotube structure along a third axis which is substantially perpendicular to the first axis and the second axis.

3. The apparatus of claim 2, wherein the first axis is substantially perpendicular to the second axis.

4. The apparatus of claim 3, further comprising a first measuring device and a second measuring device, wherein the first measuring device is electrically connected to the first electromagnetic wave sensor, and the second measuring device is electrically connected to the second electromagnetic wave sensor.

5. The apparatus of claim 4, wherein the first measuring device is electrically connected to the first electrodes, and the second measuring device is electrically connected to the second electrodes.

6. The apparatus of claim 5, wherein each of the first measuring device and the second measuring device is an electric current measuring device or a voltage measuring device.

7. The apparatus of claim 6, wherein each of the first measuring device and the second measuring device is an ammeter or a voltmeter.

8. The apparatus of claim 2, wherein each of the first carbon nanotube structure and the second carbon nanotube structure comprises at least one carbon nanotube film, at least one carbon nanotube wire structure, or a combination thereof.

9. The apparatus of claim 8, wherein the at least one carbon nanotube film comprises a drawn carbon nanotube film, a strip-shaped carbon nanotube film, or a carbon nanotube film of ultra-long carbon nanotubes.

10. The apparatus of claim 8, wherein the at least one carbon nanotube wire structure bends orderly in a surface, thereby forming a planar structure.

11. The apparatus of claim 8, wherein the at least one carbon nanotube wire structure comprises a plurality of carbon nanotube wire structures substantially parallel to each other and arranged side by side besides in a surface, thereby forming a substantially planar structure.

12. An apparatus comprising:
a plurality of first conductive strips substantially parallel to and spaced from each other;
a plurality of second conductive strips substantially parallel to and spaced from each other, the plurality of second conductive strips crossing with the plurality of first conductive strips to from a grid structure comprising a plurality of isolated regions arranged in lines and rows; and
a plurality of electromagnetic wave detection units located in the plurality of isolated regions in a one-to-one manner, wherein each of the plurality of electromagnetic wave detection units comprises:
a first electromagnetic wave sensor;
two first electrodes electrically connected to different portions of the first electromagnetic wave sensor, wherein one of the two first electrodes is electrically connected to one of the plurality of first conductive strips surrounding each of the plurality of electromagnetic wave detection units, and the other one of the two first electrodes is electrically connected to one of the plurality of second conductive strips surrounding each of the plurality of electromagnetic wave detection units;
a second electromagnetic wave sensor crossing with and spaced from the first electromagnetic wave sensor; and
two second electrodes electrically connected to different portions of the second electromagnetic wave sensor, wherein one of the two second electrodes is electrically connected to another one of the plurality of first conductive strips surrounding each of the plurality of electromagnetic wave detection units, and the other one of the two second electrodes is electrically connected to another one of the plurality of second conductive strips surrounding each of the plurality of electromagnetic wave detection units.

13. The apparatus of claim 12, wherein the first electromagnetic wave sensor comprises a first carbon nanotube structure comprising a plurality of carbon nanotubes arranged substantially along a first axis; the second electromagnetic wave sensor comprises a second carbon nanotube structure comprising a plurality of carbon nanotubes arranged substantially along a second axis; the first carbon nanotube structure is spaced from the second carbon nanotube structure along a third axis which is substantially perpendicular to the first axis and the second axis.

14. The apparatus of claim 13, wherein each of the first carbon nanotube structure and the second carbon nanotube structure comprises at least one carbon nanotube film, at least one carbon nanotube wire structure, or a combination thereof.

15. The apparatus of claim 12, wherein each of the plurality of electromagnetic wave detection units further comprises a first measuring device electrically connected to the first electromagnetic wave sensor and a second measuring device electrically connected to the second electromagnetic wave sensor.

16. The apparatus of claim 15, wherein each of the first measuring device and the second measuring device is an electric current measuring device or a voltage measuring device.

17. An apparatus comprising:
a first carbon nanotube structure comprising a plurality of carbon nanotubes arranged substantially along a first axis;
two first electrodes electrically connected to the first carbon nanotube structure;
a first measuring device connecting to the first carbon nanotube structure;
a second carbon nanotube structure comprising a plurality of carbon nanotubes arranged substantially along a second axis which is different from the first axis, wherein the second carbon nanotube structure overlaps above the first carbon nanotube structure along a third axis which is substantially perpendicular to the first axis and the second axis;
two second electrodes electrically connected to the second carbon nanotube structure; and
a second measuring device connected to the second carbon nanotube structure.

18. The apparatus of claim 17, wherein the first axis is substantially perpendicular to the second axis.

19. The apparatus of claim 17, wherein each of the first carbon nanotube structure and the second carbon nanotube structure comprises at least one carbon nanotube film, at least one carbon nanotube wire structure, or a combination thereof.

20. The apparatus of claim 17, wherein each of the first measuring device and the second measuring device is an electric current measuring device or a voltage measuring device.

* * * * *